(12) United States Patent
Banno (10) Patent No.: US 10,038,334 B2
(45) Date of Patent: Jul. 31, 2018

(54) DIRECT CURRENT POWER SUPPLY DEVICE CONTROL METHOD AND CONTROL DEVICE

(71) Applicant: FUJI ELECTRIC CO., LTD., Kawasaki-shi, Kanagawa (JP)

(72) Inventor: Seitaro Banno, Hino (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 56 days.

(21) Appl. No.: 15/374,413

(22) Filed: Dec. 9, 2016

(65) Prior Publication Data

US 2017/0093205 A1    Mar. 30, 2017

Related U.S. Application Data

(63) Continuation of application No. PCT/JP2014/081813, filed on Dec. 2, 2014.

(51) Int. Cl.
G06F 1/30    (2006.01)
H02J 1/12    (2006.01)
(Continued)

(52) U.S. Cl.
CPC ............. *H02J 9/00* (2013.01); *G06F 1/30* (2013.01); *H02J 1/12* (2013.01); *H02M 1/32* (2013.01);
(Continued)

(58) Field of Classification Search
None
See application file for complete search history.

(56) References Cited

U.S. PATENT DOCUMENTS

2005/0121979 A1* 6/2005 Matsumoto ......... H01M 10/441
307/66
2006/0022650 A1* 2/2006 Vinciarelli .............. H02M 1/36
323/266
(Continued)

FOREIGN PATENT DOCUMENTS

EP    2 955 830 A1    12/2015
JP    9-103032    4/1997
(Continued)

OTHER PUBLICATIONS

Internnational Search Report dated Jan. 20, 2015 in corresponding International Application No. PCT/JP2014/081813.

*Primary Examiner* — Jared Fureman
*Assistant Examiner* — Joel Barnett (57) ABSTRACT

A direct current power supply device control method and control device such that output currents of each direct current power supply unit are balanced with high accuracy using droop control that reflects wiring resistance from a multiple of direct current power supply units operated in parallel to a load. A droop characteristic of each of power supply units is expressed using wiring resistance between output terminals of the power supply units, output voltage, output current, an output voltage command value, and a droop coefficient, and the wiring resistance is calculated in advance using the output voltage and output current of each unit and voltage of an output point. When the units are operated in parallel, an output voltage command value of each unit is calculated using output current of the same magnitude common to all units, the output voltage of each unit, the droop coefficient, and the wiring resistance.

4 Claims, 10 Drawing Sheets

(51) Int. Cl.
*H02J 9/00* (2006.01)
*H02M 3/00* (2006.01)
*H02M 1/32* (2007.01)
*H02M 7/04* (2006.01)
*H02M 1/00* (2006.01)

(52) U.S. Cl.
CPC ............... *H02M 3/00* (2013.01); *H02M 7/04* (2013.01); *H02M 2001/007* (2013.01)

(56) References Cited

U.S. PATENT DOCUMENTS

| | | |
|---|---|---|
| 2006/0171178 A1 | 8/2006 | Shvarts |
| 2007/0205664 A1 | 9/2007 | Kawakubo et al. |
| 2010/0013307 A1* | 1/2010 | Heineman ................ G06F 1/26 307/33 |
| 2012/0032517 A1 | 2/2012 | Ido et al. |

FOREIGN PATENT DOCUMENTS

| | | |
|---|---|---|
| JP | 2007-209195 | 8/2007 |
| JP | 2007-236124 | 9/2007 |
| JP | 2008-527961 | 7/2008 |
| JP | 2012-39778 | 2/2012 |
| JP | 2012-210013 | 10/2012 |
| WO | WO 2014/123173 A1 | 8/2014 |

* cited by examiner

DIRECT CURRENT POWER SUPPLY DEVICE CONTROL METHOD AND CONTROL DEVICE

CROSS-REFERENCE TO RELATED APPLICATIONS

This application is a continuation application, filed under 35 U.S.C. § 111(a), of International Application PCT/JP2014/81813 filed on Dec. 2, 2014, the content of which is incorporated herein by reference in its entirety.

BACKGROUND

1. Field

The present disclosure relates to a control method and control device for balancing the output currents of power supply units with high accuracy in a direct current power supply device wherein power is supplied to a load by a multiple of direct current power supply units being operated in parallel.

2. Related Art

Existing technology described in JP Application Publication 2007-209195 (paragraphs [0035] to [0037], and [0063], FIGS. 1-4, FIG. 9, and the like) is known as a direct current power supply device formed of a multiple of direct current power supply units connected to each other in parallel.

Figure 8:
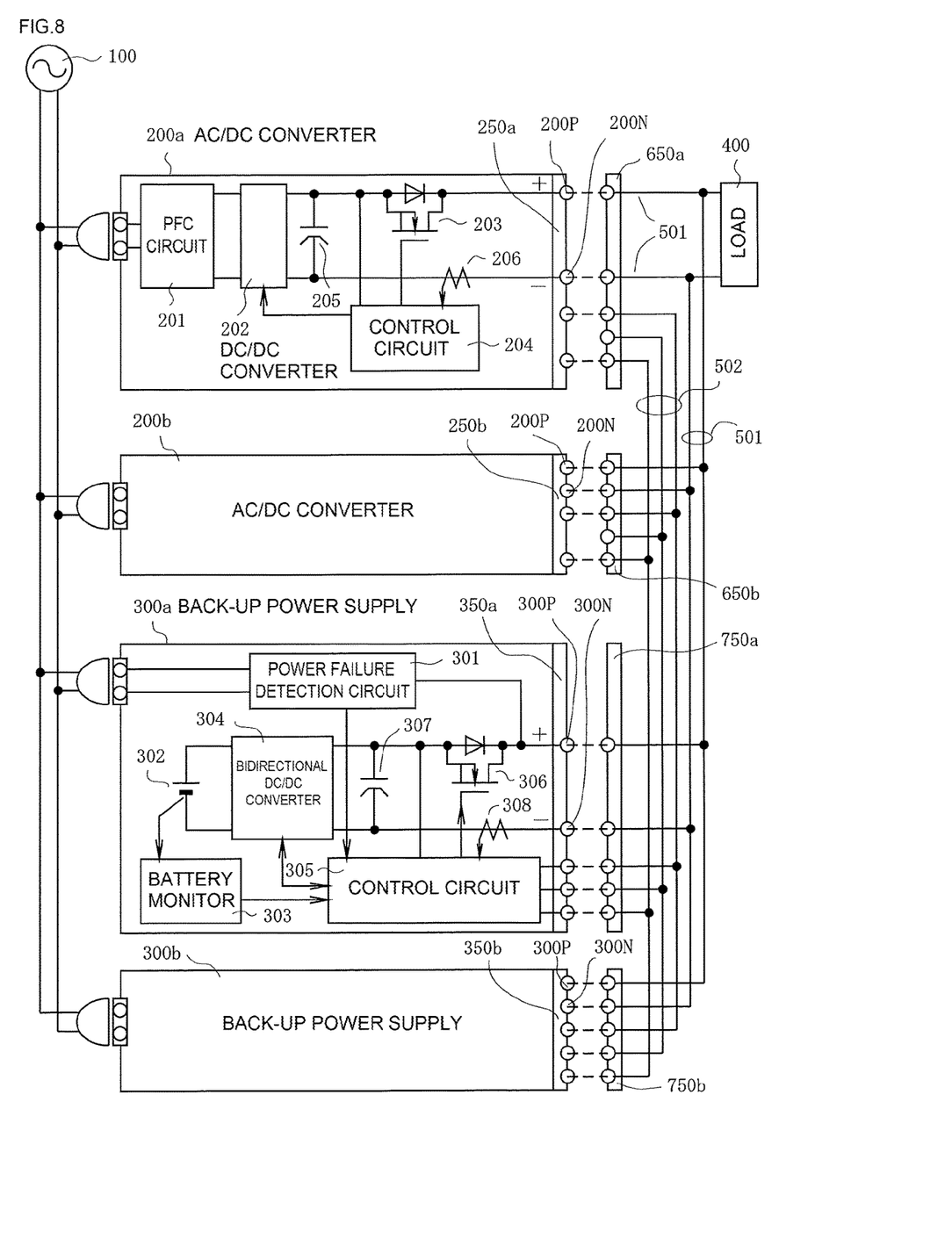
FIG. 8 is a configuration diagram showing existing technology.

FIG. 8 is a configuration diagram of the existing technology, wherein 100 is an alternating current power supply, 200a and 200b are AC/DC converters, 300a and 300b are back-up power supplies, and 400 is a load to which direct current voltage is applied. Herein, the AC/DC converters 200a and 200b and the back-up power supplies 300a and 300b all function as direct current power supply units, and are connected to each other in parallel.

The AC/DC converters 200a and 200b are of the same configuration, the AC/DC converter 200a, for example, including a power factor correction (PFC) circuit 201, a DC/DC converter 202, a semiconductor switching element 203, a control circuit 204, a smoothing capacitor 205, and a current detector 206.

Also, the back-up power supplies 300a and 300b are of the same configuration, the back-up power supply 300a, for example, including a power failure detection circuit 301, a secondary battery 302, a battery monitor 303, a bidirectional DC/DC converter 304, a control circuit 305, a semiconductor switching element 306, a smoothing capacitor 307, and a current detector 308.

200P, 200N, 300P, and 300N are positive and negative output terminals of the AC/DC converters 200a and 200b and back-up power supplies 300a and 300b. The output terminals 200P, 200N, 300P, and 300N are connected in parallel by a power line 501. Also, the AC/DC converters 200a and 200b and back-up power supplies 300a and 300b are connected to each other in parallel via a signal line 502. 250a, 250b, 350a, 350b, 650a, 650b, 750a, and 750b indicate connectors.

Figure 9:
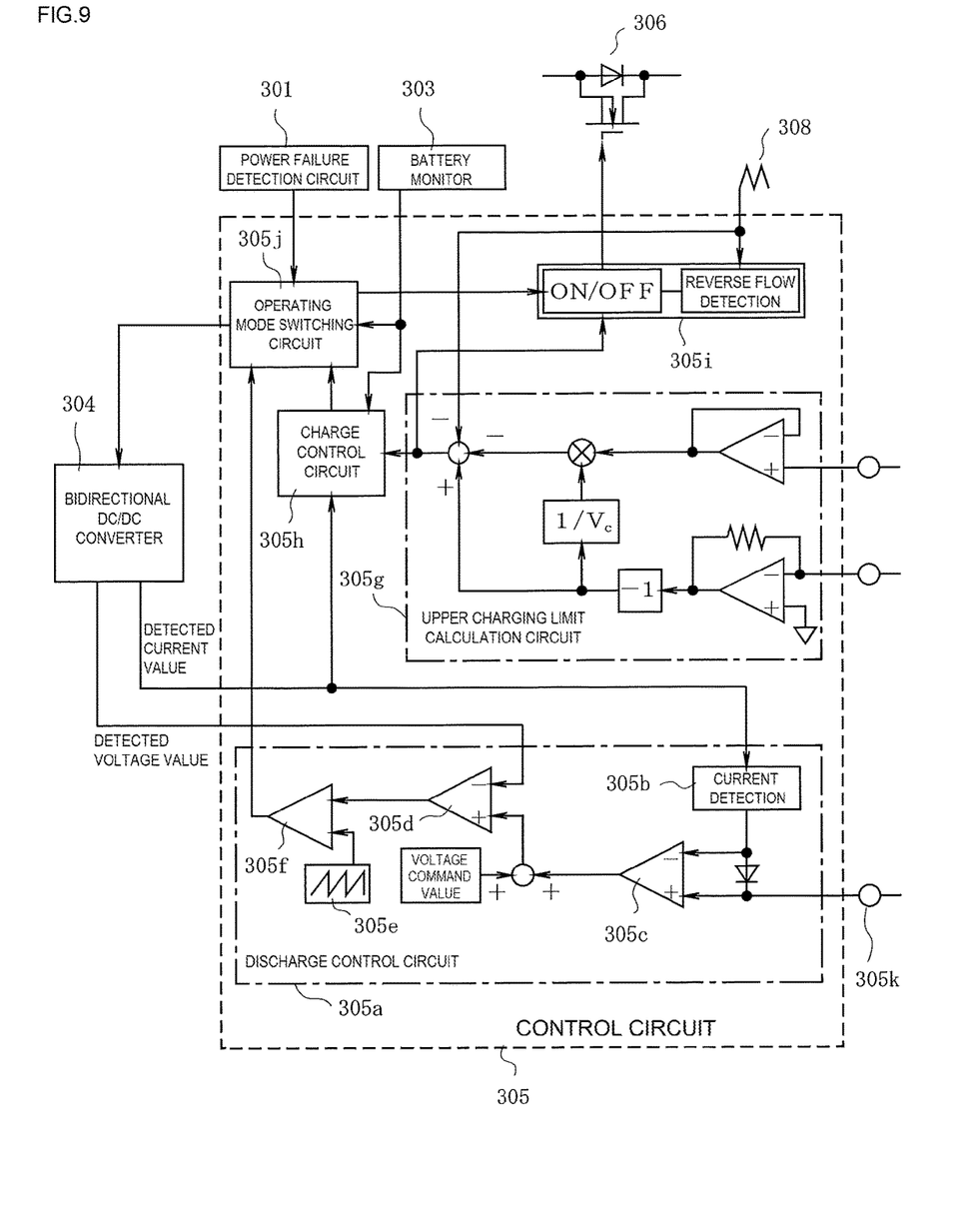
FIG. 9 is a configuration diagram of a back-up power supply control circuit in FIG. 8.

FIG. 9 shows a configuration of the control circuit 305 in the back-up power supplies 300a and 300b. In FIG. 9, 305a is a discharge control circuit, and includes a current detection unit 305b, a current error amplification circuit 305c, a voltage error amplification circuit 305d, a carrier generation circuit 305e, and a comparator 305f. Also, 305k is a terminal to which is applied a voltage proportional to a maximum value of output currents of the back-up power supplies 300a and 300b.

Furthermore, although not directly related to the disclosure, 305g is an upper charging limit calculation circuit, 305h is a charge control circuit, 305i is a reverse flow detecting protective circuit, and 305j is an operating mode switching circuit.

At this point, a description will be given of a case wherein the AC/DC converter 200a stops operating due to a failure of the alternating current power supply 100 in FIG. 8, and backing-up is carried out by a parallel operation of the back-up power supplies 300a and 300b.

In this case, a voltage proportional to a maximum value of output currents of the back-up power supplies 300a and 300b is applied to the terminal 305k in the control circuit 305 of FIG. 9. Assuming that the output current of the back-up power supply 300b is greater than that of the back-up power supply 300a, the output of the current error amplification circuit 305c in the control circuit 305 of the back-up power supply 300a is positive, and an output signal causing a voltage command value to increase is obtained from the voltage error amplification circuit 305d.

Because of this, a signal of a direction causing output voltage to increase is output from the comparator 305f, and the signal is applied via the operating mode switching circuit 305j to a switching element in the bidirectional DC/DC converter 304. Because of this, the DC/DC converter 304 operates so as to cause the output voltage to increase, as a result of which the DC/DC converter 304 operates so that the output current of the back-up power supply 300a increases, and the gap with the output current of the back-up power supply 300b is eliminated.

The output currents of the back-up power supplies 300a and 300b are balanced by the operation described above in Patent Literature 1.

Figure 10:
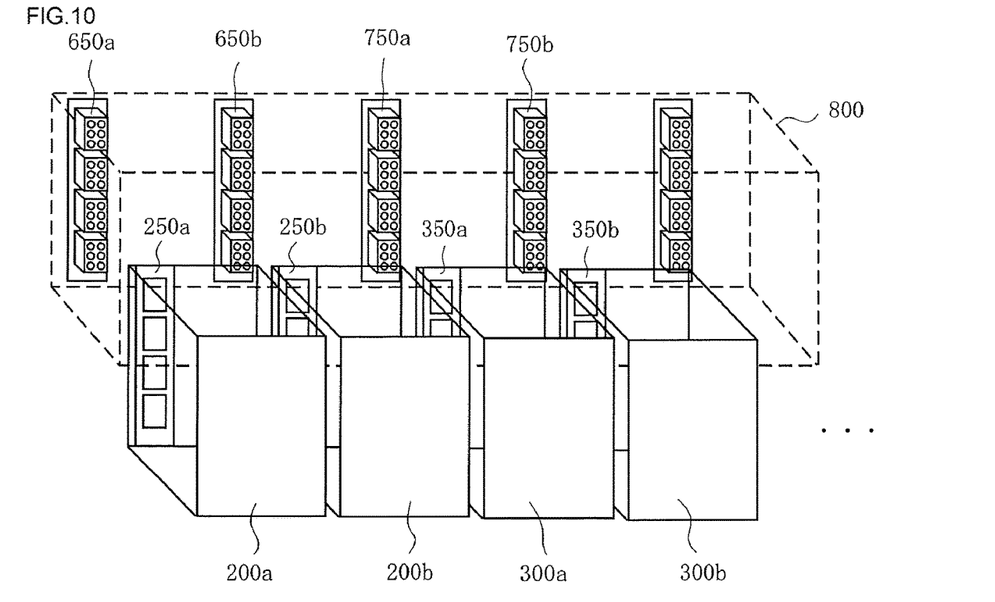
FIG. 10 is a perspective view showing a mounting structure of each unit in FIG. 8.

Herein, FIG. 10 shows an example of a mounting structure of the AC/DC converters 200a and 200b and back-up power supplies 300a and 300b. The AC/DC converters 200a and 200b and back-up power supplies 300a and 300b are mounted by the connectors 250a, 250b, 350a, and 350b being connected to the connectors 650a, 650b, 750a, and 750b respectively on a device main body 800 side.

SUMMARY

There is a function whereby, when a load current increases when a multiple of direct current power supply units operate in parallel, the output voltage of a unit with high output voltage is reduced to reduce the output current of the relevant unit, thereby balancing output current by sharing the load current with another unit (a droop current sharing function).

Figure 11:
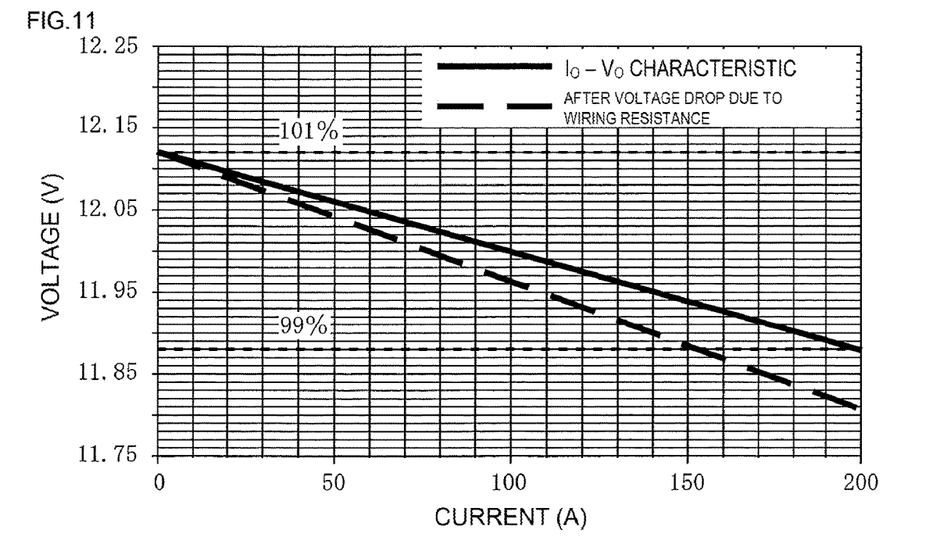
FIG. 11 is a diagram showing a droop characteristic of a direct current power supply unit.

FIG. 11 shows an example of this droop characteristic. A solid line in the drawing is an existing output current–output voltage characteristic ($I_O$–$V_O$ characteristic) when the rated output voltage of each unit is 12V DC (100%). This droop characteristic can normally be expressed as $$V_O = \text{voltage command value} - K \times I_O,$$

wherein K indicates a droop coefficient.

However, the kind of direct current power supply device described in JP Application Publication 2007-209195 (FIGS. 8-10) is such that a voltage drop occurs due to wiring resistance of the power line 501 from the output terminals 200P and 200N of the AC/DC converters 200a and 200b via the connectors 650a and 650b to the load 400, and the magnitude of the voltage drop is a value that varies in accordance with wiring length. This is a problem that also applies to the back-up power supplies 300a and 300b.

Because of this, even when, for example, the droop characteristic of one of the AC/DC converters 200*a* and 200*b* is as indicated by the solid line of FIG. 11, the droop characteristic of the other, which has a greater wiring resistance to the load 400, may be as indicated by a broken line in FIG. 11. That is, even when the output voltages of the converters are the same when the two converters 200*a* and 200*b* are operated in parallel, there is a problem in that a situation wherein one converter outputs 200A but the other converter can output only 150A occurs, the output currents of the converters 200*a* and 200*b* become unbalanced, and rated operation as a system becomes impossible.

Therefore, an aspect of the disclosure is to provide a direct current power supply device control method and control device such that, in a case of a multiple of direct current power supply units operated in parallel, the output currents of the units are balanced with high accuracy by using droop characteristics in accordance with a voltage drop caused by wiring resistance from each unit to a load.

In order to achieve the heretofore described aspect, a control method according to the disclosure, being a control method of a direct current power supply device that supplies direct current power to a load by a plurality of direct current power supply units having droop characteristics being operated in parallel, relates to a control method for equalizing output currents of the plurality of direct current power supply units.

Further, the control method is characterized in that a droop characteristic of each of the plurality of direct current power supply units is expressed using wiring resistance between output terminals of the plurality of direct current power supply units, output voltage, output current, and an output voltage command value of the direct current power supply unit, and a droop coefficient, and the wiring resistance is calculated in advance using the output voltage and output current of each direct current power supply unit and voltage of an output point of the direct current power supply device. Furthermore, when the plurality of direct current power supply units are operated in parallel, an output voltage command value of each direct current power supply unit is calculated using output current of the same magnitude common to the plurality of direct current power supply units, the output voltage of each direct current power supply unit, the droop coefficient, and the wiring resistance.

The control method may have the additional features that, as a calibration operation that calculates the output voltage command value of each direct current power supply unit in order to carry out parallel operation of the plurality of direct current power supply units, the output voltage of one other direct current power supply unit is gradually raised when one direct current power supply unit operates, the wiring resistance is calculated using the output voltage and output current of the one other direct current power supply unit and the voltage of the output point of the direct current power supply device, and the output voltage command value of the one other direct current power supply unit is calculated using output current of the same magnitude common to the plurality of direct current power supply units, the output voltage of the one other direct current power supply unit, the droop coefficient, and the wiring resistance.

A control device according to the disclosure, being a control device of a direct current power supply device that supplies direct current power to a load by a plurality of direct current power supply units having droop characteristics being operated in parallel, relates to a control device for equalizing output currents of the plurality of direct current power supply units.

Further, the control device has external management means or a communication interface capable of communication with the plurality of direct current power supply units, and the direct current power supply unit includes means of detecting output voltage and output current of the direct current power supply unit itself, and calculation means that calculates an output voltage command value of the direct current power supply unit itself.

Also, the management means includes droop characteristics expressed using wiring resistance between output terminals of the plurality of direct current power supply units, output voltages, output currents, and output voltage command values of the plurality of direct current power supply units, and a droop coefficient, and includes means that calculates the wiring resistance in advance using the output voltage and output current of each direct current power supply unit and voltage of an output point of the direct current power supply device, and when the plurality of direct current power supply units are operated in parallel, calculates corrective resistance based on the wiring resistance and transmits the corrective resistance to each direct current power supply unit.

Furthermore, each of the plurality of direct current power supply units, using the calculation means, calculates an output voltage command value of the direct current power supply unit itself using output current of the same magnitude common to all the direct current power supply units, the output voltage of each direct current power supply unit, the droop coefficient, and the corrective resistance.

The control device as discussed above may have the additional features that the plurality of direct current power supply units are a plurality of main power supply units, which convert alternating current power to direct current power and supply the direct current power to the load, or a plurality of back-up units, which supply direct current power to the load when operation of the main power supply unit is stopped.

According to the disclosure, the output currents of the units can be balanced with high accuracy by the units being operated in parallel based on droop characteristics in accordance with wiring resistance between each direct current power supply unit and the output point of the direct current power supply device.

DESCRIPTION OF EMBODIMENTS

Hereafter, based on the drawings, a description will be given of an embodiment of the disclosure. Firstly, FIG. 1 shows a configuration of a direct current power supply device according to the embodiment of the disclosure.

Figure 1:
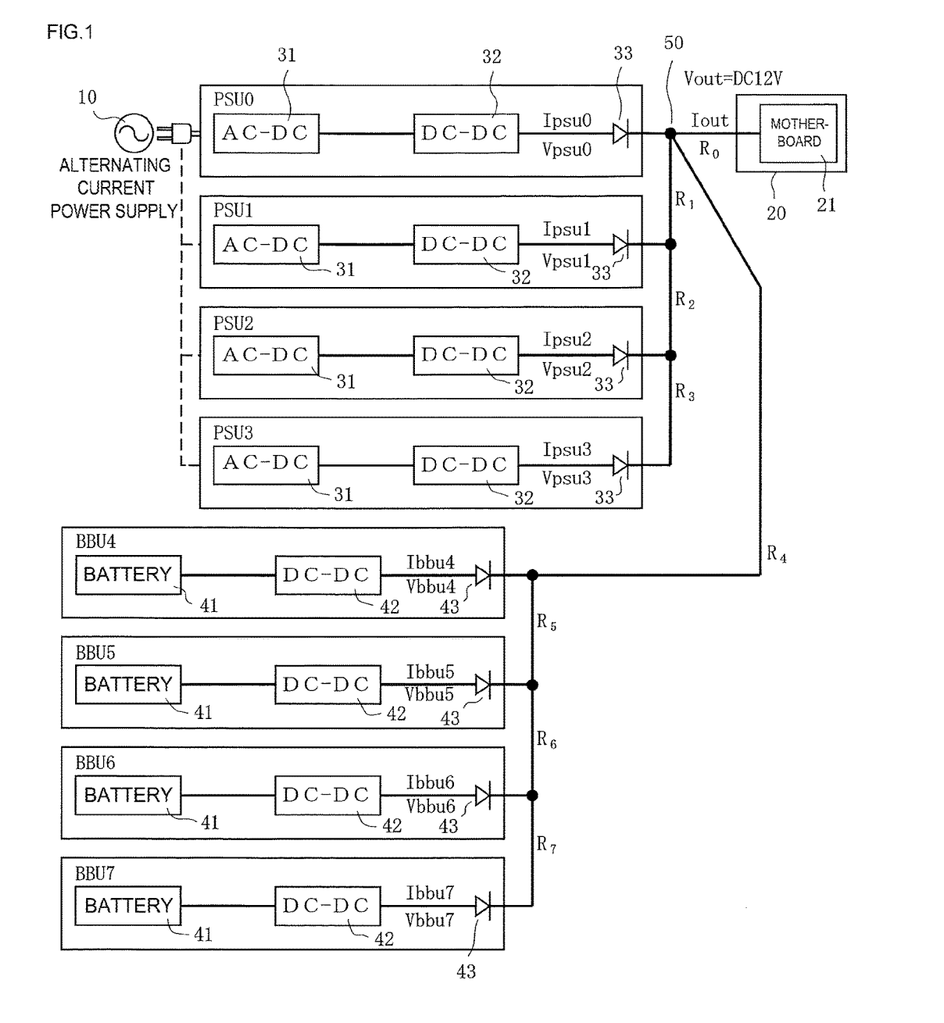
FIG. 1 is a configuration diagram showing an embodiment of the disclosure.

In FIG. 1, a load 20 is connected via power supply units PSU0 through PSU3 operated in parallel to an alternating current power supply 10 such as a commercial power supply. Although not particularly limited provided that a direct current voltage is supplied, the load 20 is, for example, a server or storage in which a motherboard 21 is incorporated.

The configurations of the power supply units PSU0 through PSU3, are all the same, including an AC/DC conversion unit 31, which is connected to the alternating current power supply 10 and converts alternating current voltage into direct current voltage, a DC/DC conversion unit 32, which is connected to the output side of the AC/DC conversion unit 31 and converts the direct current voltage into direct current voltage of a predetermined magnitude, and a diode 33 connected between the output side of the DC/DC conversion unit 32 and the load 20.

Also, a multiple (four in the example shown) of battery units BBU4 through BBU7 are connected so that output sides thereof are parallel to those of the power supply units PSU0 through PSU3. Configurations of the battery units BBU4 through BBU7 are all the same, including a battery 41, a DC/DC conversion unit 42 that converts direct current voltage of the battery 41 into direct current voltage of a predetermined magnitude, and a diode 43 connected between the output side of the DC/DC conversion unit 42 and the load 20.

The power supply units PSU0 through PSU3 are operated to supply direct current voltage to the load 20 when the alternating current power supply 10 is sound, and the battery units BBU4 through BBU7 supply direct current voltage to the load 20 when the alternating current power supply 10 fails, or when operation of a power supply unit stops due to a failure thereof. That is, the power supply units PSU0 through PSU3 function as a main power supply unit, and the battery units BBU4 through BBU7 function as a back-up unit.

The number of power supply units and battery units not being limited in any way to the example of FIG. 1, optional numbers are connected in parallel in accordance with the necessary amount of power supply.

Herein, with power line wiring resistance between an output point (a common connection point on the output side of the power supply units PSU0 through PSU3) 50 of the direct current power supply device and the load 20 taken to be $R_0$, wiring resistances between neighboring output terminals of the power supply units PSU0 through PSU3 taken to be $R_1$ through $R_3$ respectively, and wiring resistance between the output point 50 and the battery unit BBU4 taken to be $R_4$, wiring resistances between neighboring output terminals of the battery units BBU4 through BBU7 are taken to be $R_5$ through $R_7$ respectively.

Furthermore, output currents of the units PSU0 through PSU3 and BBU4 through BBU7 are taken to be $I_{psu0}$ through $I_{psu3}$ and $I_{bbu4}$ through $I_{bbu7}$ respectively, and output voltages are taken to be $V_{psu0}$ through $V_{psu3}$ and $V_{bbu4}$ through $V_{bbu7}$ respectively.

Herein, when considering balance of the output currents of the units PSU0 through PSU3 when all the power supply units PSU0 through PSU3 are operated in parallel, Expression 1 through Expression 4 below are established. Herein, a forward voltage drop of the diode 33 (the same also applies to the diode 43 in the battery units) is ignored.

$$I_{psu0} = I_{psu1} = I_{psu2} = I_{psu3} \quad \text{[Math. 1]}$$

$$V_{psu1} - V_{psu0} = (I_{psu1} + I_{psu2} + I_{psu3}) \times R_1 = 3 \times R_1 \times I_{psu1} \quad \text{[Math. 2]}$$

$$V_{psu2} - V_{psu0} = 3 \times R_1 \times I_{psu1} + (I_{psu2} + I_{psu3}) \times R_2$$
$$= (3 \times R_1 + 2 \times R_2) \times I_{psu2} \quad \text{[Math. 3]}$$

$$V_{psu3} - V_{psu0} = (3 \times R_1 + 2 \times R_2) \times I_{psu2} + I_{psu3} \times R_2$$
$$= (3 \times R_1 + 2 \times R_2 + R_3) \times I_{psu3} \quad \text{[Math. 4]}$$

When calculating droop characteristics of the power supply units PSU0 through PSU3 by reflecting the wiring resistance of each region based on Expression 1 through Expression 4, Expression 5 through Expression 8 respectively are obtained. In Expression 5 through Expression 8, K is a predetermined droop coefficient.

$$V_{psu0} = \text{voltage command value} - K \times I_{psu0} \quad \text{[Math. 5]}$$

$$V_{psu1} = \text{voltage command value} - (K - 3 \times R_1) \times I_{psu1} \quad \text{[Math. 6]}$$

$$V_{psu2} = \text{voltage command value} - (K - 3 \times R_1 - 2 \times R_2) \times I_{psu2} \quad \text{[Math. 7]}$$

$$V_{psu3} = \text{voltage command value} - (K - 3 \times R_1 - 2 \times R_2 - R_3) \times I_{psu3} \quad \text{[Math. 8]}$$

That is, it can be said that Expression 6 through Expression 8 are expressions wherein the droop characteristic shown in Expression 5 (the droop coefficient K) is corrected.

Figure 2:
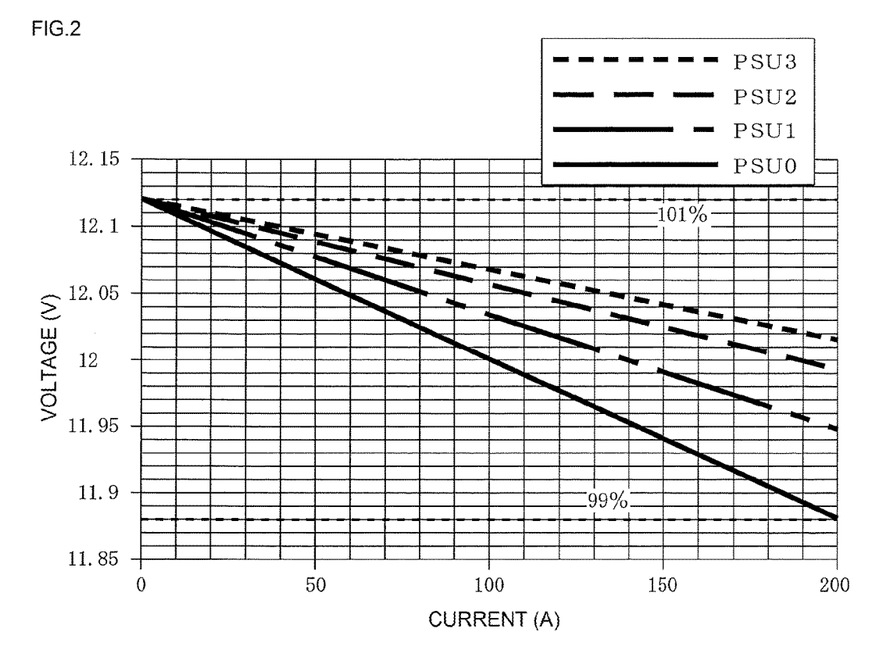
FIG. 2 is a diagram showing droop characteristics of power supply units in FIG. 1.

FIG. 2 shows the droop characteristics of the power supply units PSU0 through PSU3 according to Expression 5 through Expression 8, and is a case wherein the rated output voltage of each unit is 12V DC (100%).

Also, for example, when the power supply unit PSU1 in FIG. 1 is standing by as a back-up, when the power supply unit PSU1 is not mounted, or the like, Expression 9 through Expression 11 are established when considering balance of the output currents of the units PSU0, PSU2, and PSU3 when the three power supply units PSU0, PSU2, and PSU3 are operated in parallel.

$$I_{psu0} = I_{psu2} = I_{psu3} \quad \text{[Math. 9]}$$

$$V_{psu2} - V_{psu0} = (I_{psu2} + I_{psu3}) \times (R_1 + R_2) = (2 \times R_1 + 2 \times R_2) \times I_{psu2} \quad \text{[Math. 10]}$$

$$V_{psu3} - V_{psu0} = (2 \times R_1 + 2 \times R_2) \times I_{psu2} + I_{psu3} \times R_2 = (2 \times R_1 + 2 \times R_2 + R_3) \times I_{psu3} \quad \text{[Math. 11]}$$

When calculating droop characteristics of the power supply units PSU0, PSU2 and PSU3 in the same way by reflecting the wiring resistance of each region based on Expression 9 through Expression 11, Expression 12 through Expression 14 respectively are obtained.

$$V_{psu0} = \text{voltage command value} - K \times I_{psu0} \quad \text{[Math. 12]}$$

$$V_{psu2} = \text{voltage command value} - (K - 2 \times R_1 - 2 \times R_2) \times I_{psu2} \quad \text{[Math. 13]}$$

$$V_{psu3} = \text{voltage command value} - (K - 2 \times R_1 - 2 \times R_2 - R_3) \times I_{psu3} \quad \text{[Math. 14]}$$

As heretofore described, provided that an output voltage $V_{psun}$ and output current $I_{psun}$ of each power supply unit PSUn (n=0, 1, 2, 3) and a wiring resistance $R_n$ between the output terminals of each power supply unit can be detected, a droop characteristic in which wiring resistance is reflected (Expressions 5 through 8 and Expressions 12 through 14) can be calculated for each power supply unit PSUn. Further, when a multiple of power supply units PSUn are operated in parallel, an output voltage command value for each power supply unit PSUn can be calculated by substituting the output voltage $V_{psun}$ and necessary wiring resistance $R_n$ of each unit in the expressions, and by substituting the output current $I_{psun}$, which is a common value, in order to balance the output currents $I_{psun}$.

By each power supply unit PSUn being operated in accordance with the output voltage command value calculated in this way, parallel operation can be carried out in a state wherein the output currents $I_{psun}$ of the power supply units PSUn are balanced.

Next, assuming a case wherein the four power supply units PSU0 through PSU3 are operated in parallel, a description will be given of a method of calculating the wiring resistances $R_0$, $R_1$, $R_2$, and $R_3$ in advance using a calibration operation.

Firstly, only the power supply unit PSU1, for example, is started up in a state wherein the power supply unit PSU0 is being operated, and the output voltage $V_{psu1}$ thereof is gradually raised. When the voltage $V_{psu1}$ exceeds the output voltage $V_{psu0}$ of the power supply unit PSU0 and the current $I_{psu1}$ flows from the power supply unit PSU1, Expression 15 through Expression 17 below are established.

$$I_{out} = I_{psu0} + I_{psu1} \quad \text{[Math. 15]}$$

$$V_{psu0} - V_{out} = R_0 \times I_{out} \quad \text{[Math. 16]}$$

$$V_{psu1} - V_{psu0} = R_1 \times I_{psu1} \quad \text{[Math. 17]}$$

When taking the output voltage $V_{psu0}$ of the power supply unit PSU0 to be constant, the wiring resistance $R_1$ can be calculated from Expression 17 provided that the output voltage $V_{psu1}$ and output current $I_{psu1}$ of the power supply unit PSU1 during calibration are known.

Next, Expression 18 is obtained by only the power supply unit PSU2 being started up, and a calibration operation being carried out.

$$V_{psu2} - V_{psu0} = (R_1 + R_2) \times I_{psu2} \quad \text{[Math. 18]}$$

Herein, as $R_1$ is already calculated, the wiring resistance $R_2$ can be calculated provided that the output voltage $V_{psu2}$ and output current $I_{psu2}$ of the power supply unit PSU2 during calibration are known.

In the same way, Expression 19 is obtained by only the power supply unit PSU3 being started up, and a calibration operation being carried out.

$$V_{psu3} - V_{psu0} = (R_1 + R_2 + R_3) \times I_{psu3} \quad \text{[Math. 19]}$$

Herein, as $R_1$ and $R_2$ are already calculated, the wiring resistance $R_3$ can be calculated provided that the output voltage $V_{psu3}$ and output current $I_{psu3}$ of the power supply unit PSU3 during calibration are known.

Also, according to Expression 16, the wiring resistance $R_0$ between the output point 50 and load 20 can also be calculated provided that $V_{psu0}$, $V_{out}$, and $I_{out}$ are known.

In the above description, the operations of calibrating the power supply units PSU1 through PSU3 are described, but the wiring resistances $R_4$ through $R_7$ can also be calculated using a preliminary calibration operation when the battery units BBU4 through BBU7 are operated in parallel in order to back up the power supply units PSU1 through PSU3.

Droop characteristics of the battery units BBU4 through BBU7 in this case are as in Expressions 20 through 23 respectively, and by an output voltage command value being calculated for each of the units BBU4 through BBU7, and each unit BBU4 through BBU7 being operated in accordance with the respective output voltage command value, the output currents $I_{bbu4}$ through $I_{bbu7}$ can be balanced.

$$V_{bbu4} = \text{voltage command value} - (K - 4 \times R_4) \times I_{bbu4} \quad \text{[Math. 20]}$$

$$V_{bbu5} = \text{voltage command value} - (K - 4 \times R_4 - 3 \times R_5) \times I_{bbu5} \quad \text{[Math. 21]}$$

$$V_{bbu6} = \text{voltage command value} - (K - 4 \times R_4 - 3 \times R_5 - 2 \times R_6) \times I_{bbu6} \quad \text{[Math. 22]}$$

$$V_{bbu7} = \text{voltage command value} - (K - 4 \times R_4 - 3 \times R_5 - 2 \times R_6 - R_7) \times I_{bbu7} \quad \text{[Math. 23]}$$

Figure 3:
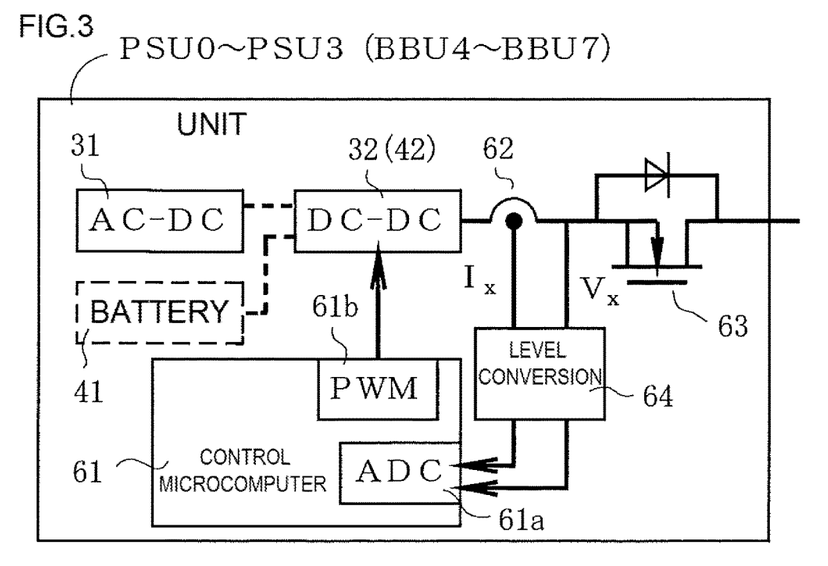
FIG. 3 is a configuration diagram of a main portion of each unit in FIG. 1.

Next, FIG. 3 is a configuration diagram for detecting an output current $I_x$ and output voltage $V_x$ of the units PSU0 through PSU3 and BBU4 through BBU7, with the configuration being common to all units.

In FIG. 3, a reverse flow prevention element 63 is connected to the output side of the DC/DC conversion unit 32 (42) in, for example, the power supply unit PSU0. The reverse flow prevention element 63 is a semiconductor element such as an OR-ing MOSFET (metal-oxide-semiconductor field effect transistor) with an ultra-low on-state resistance, which prevents reverse flow of current when a multiple of units are operated in parallel, wherein voltage drop when current flows through is of a level that can be ignored.

The output current $I_x$ and output voltage $V_x$ of the DC/DC conversion unit 32 (42) are input via a level conversion unit 64 into an A/D (analog/digital) conversion unit 61a of a control microcomputer 61, wherein the output current $I_x$ and output voltage $V_x$ can be calculated by arithmetic processing. 61b is a PWM circuit that generates a pulse width modulation (PWM) signal for driving a semiconductor switching element of the DC/DC conversion unit 32 (42), and 62 is a direct current detector.

By all the units PSU0 through PSU3 and BBU4 through BBU7 including the configuration of FIG. 3, the control microcomputer 61 can detect the output current $I_x$ and output voltage $V_x$ of the control microcomputer 61 itself. Also, when communicating by specifying the address of a predetermined unit from a master side management microcomputer 80, to be described hereafter, the management microcomputer 80 can monitor the output current $I_x$ and output voltage $V_x$ of the relevant unit.

Figure 4:
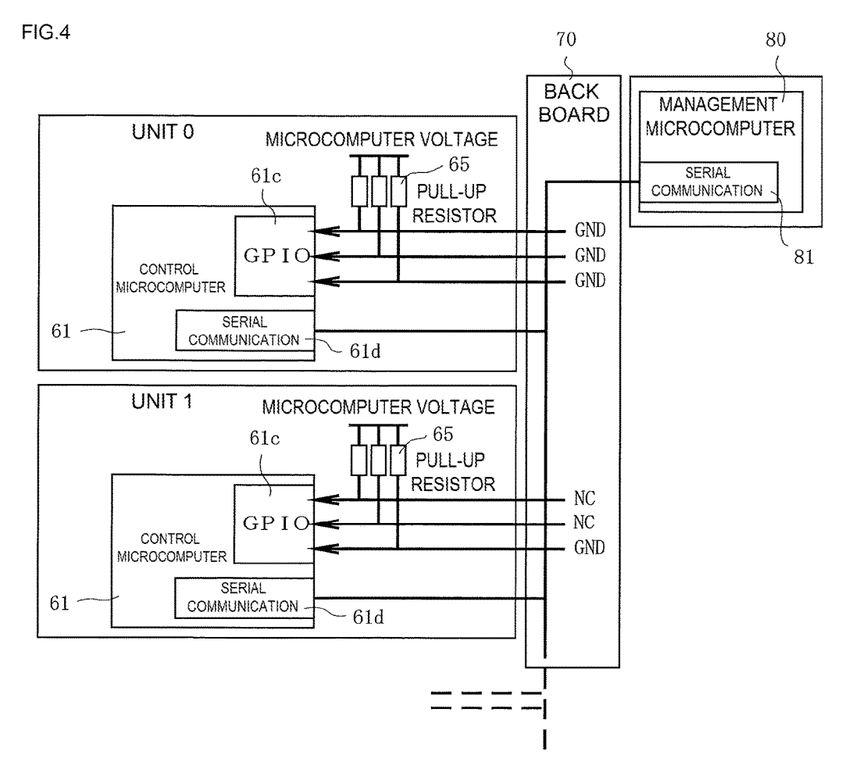
FIG. 4 is a configuration diagram of a main portion of each unit in FIG. 1.

FIG. 4 shows a configuration for specifying the address of each unit (for the sake of convenience, taken to be units 0 and 1) from the master side management microcomputer 80, and monitoring the output current $I_x$ and output voltage $V_x$. The unit 0 and unit 1 correspond to one of the power supply units PSU0 through PSU3 and one of the battery units BBU4 through BBU7.

Figure 5:
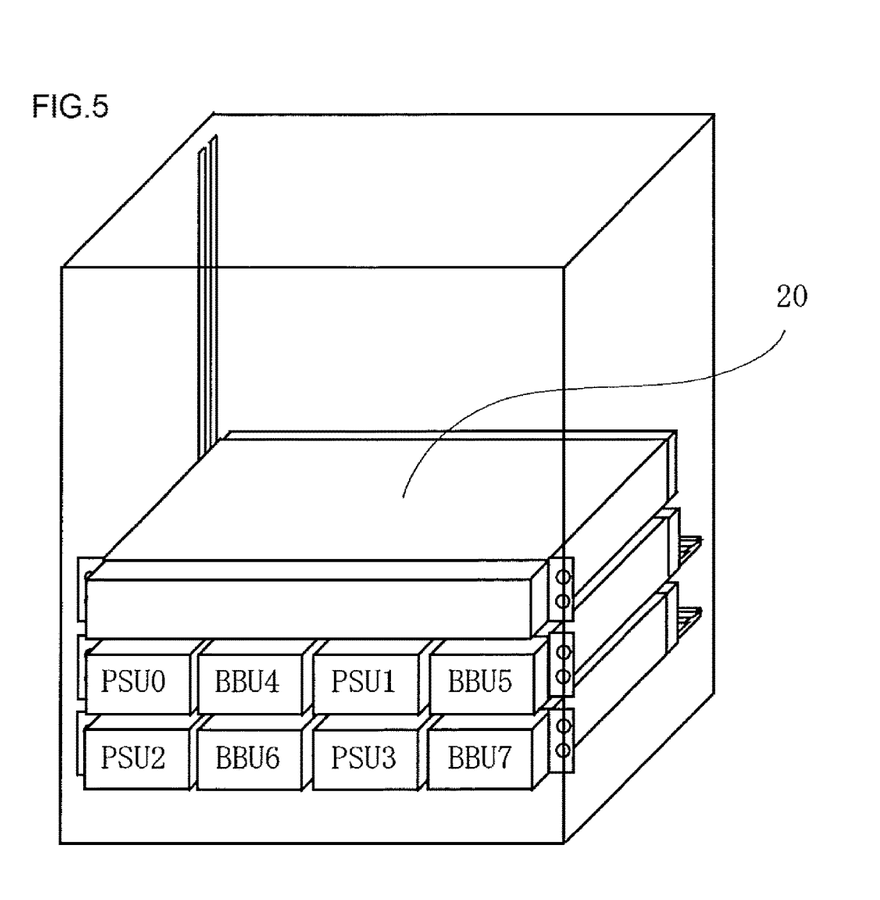
FIG. 5 is a perspective view showing a mounting structure of each unit and a load in FIG. 1.
Figure 6:
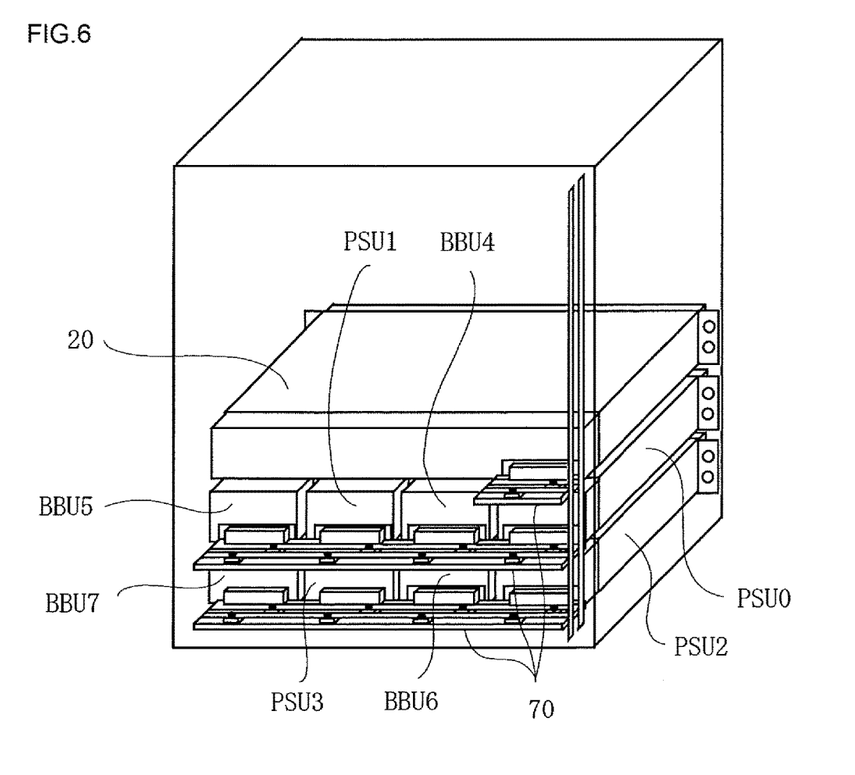
FIG. 6 is a perspective view showing a mounting structure of each unit and the load in FIG. 1.

Herein, an example of a mounting structure of the units PSU0 through PSU3 and BBU4 through BBU7 and the load 20 is as shown in FIG. 5 and FIG. 6. FIG. 5 is a perspective view of the front side, FIG. 6 is a perspective view of the back side, and a back board 70 to which the direct current output terminals of the units PSU0 through PSU 3 and BBU4 through BBU7 are wired OR-connected is disposed on the back side, as shown in FIG. 6.

Returning to FIG. 4, the control microcomputer 61 in, for example, unit 0 includes a general purpose input/output (GPIO) unit 61c and a serial communication unit 61d (collectively a communication interface), and a power supply voltage of the control microcomputer 61 is applied via a pull-up resistor 65 to the general purpose input/output unit

61c. Also, the general purpose input/output unit 61c is connected to a ground terminal GND in the back board 70, or is in a non-connected (NC) state.

Furthermore, the serial communication unit 61d is connected via the back board 70 to a serial communication unit 81 (an example of a communication interface) of the management microcomputer 80.

This kind of configuration is such that the management microcomputer 80 can recognize the address (the mounting position in FIG. 5 and FIG. 6) of each unit by detecting the connection state of the general purpose input/output unit 61c and back board 70 via the serial communication units 81 and 61d.

For example, as in FIG. 4, the general purpose input/output unit 61c allots the address of the unit 0 connected to "GND, GND, GND" to a 0 compartment, and in the same way, allots the address of the unit 1 (corresponding to, for example, one of the power supply units PSU1 through PSU3 in FIG. 1) connected to "NC, NC, GND" to a 1 compartment. In this case, as the management microcomputer 80 can recognize that the unit 1 is disposed in the 1 compartment, the management microcomputer 80 can calculate the wiring resistance by monitoring the output current and output voltage of the unit 1 when an operation of calibrating the unit 1 is carried out. Furthermore, an output voltage command value of the unit 1 can also be calculated using the wiring resistance, output voltage, and output current in accordance with Expressions 6 through 8 or Expressions 12 through 14.

A method of recognizing the address of each unit not being limited in any way to the heretofore described method, it goes without saying that another method may be used.

Figure 7:
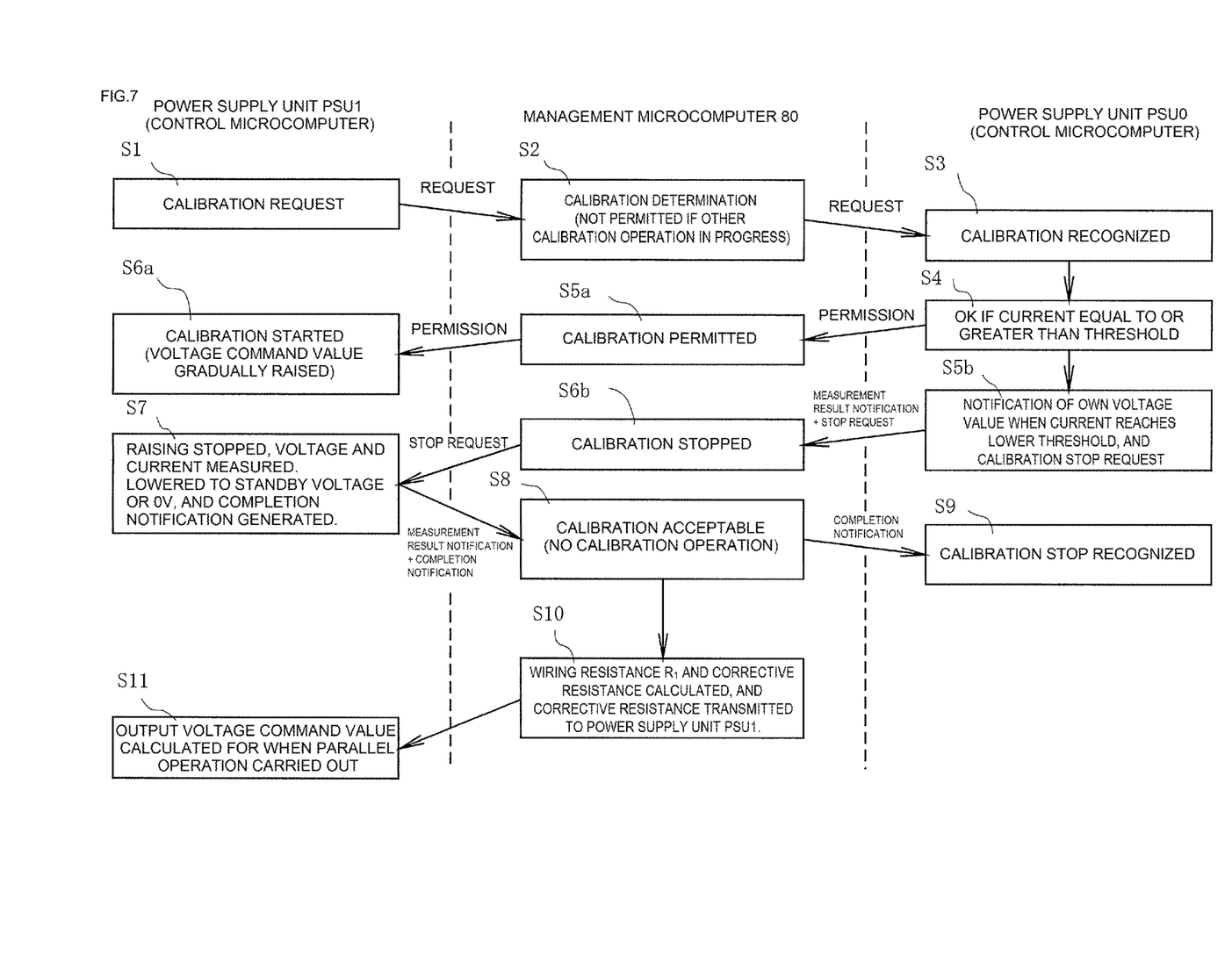
FIG. 7 is a flowchart showing a process in each unit when there is a calibration request in the embodiment of the disclosure.

The process of calculating wiring resistance, and calculating the output voltage command value of the unit 1 using the wiring resistance, output voltage, and output current, can also be executed by the control microcomputer 61 in the unit 1, because of which the output voltage command value of the unit 1 may be calculated on the unit 1 side, as shown in FIG. 7 to be described hereafter.

FIG. 7 is a flowchart showing a process in each unit when there is a calibration request from a certain power supply unit, for example PSU1.

Firstly, when the control microcomputer 61 of the power supply unit PSU1 outputs a calibration request while the power supply unit PSU0 is operating (step S1), the management microcomputer 80, on receiving the calibration request, determines the suitability of the calibration request (S2). Specifically, when another power supply unit is carrying out a calibration operation, the calibration request generated this time is not permitted, but when no calibration operation is being carried out, the calibration request is permitted. Herein, which power supply unit the calibration request is output from can be identified by the management microcomputer 80 recognizing the address using the previously described method.

Herein, a calibration request may be automatically generated when hot swapping (hot-line mounting) a power supply unit.

When the management microcomputer 80 permits a calibration request, the management microcomputer 80 notifies the power supply unit PSU0 that there is a request, and the power supply unit PSU0 recognizes the notification (S3). When the output current $I_{psu0}$ of the power supply unit PSU0 itself reaches zero, the power supply unit PSU0 cannot measure the output voltage $V_{psu0}$, as a result of which there is concern that an excessive voltage will be applied to the load 20. Because of this, the power supply unit PSU0 permits calibration when the output current $I_{psu0}$ is equal to or greater than a threshold, and notifies the management microcomputer 80 (S4).

The management microcomputer 80 receives the notification, and notifies the power supply unit PSU1 that calibration is permitted (S5a). Also, a calibration stop request is generated in the power supply unit PSU0 when the output current $I_{psu0}$ reaches an upper threshold, and the power supply unit PSU0 notifies the management microcomputer 80 of the stop request together with the output voltage $V_{psu0}$ of the power supply unit PSU0 itself (S5b).

Meanwhile, the power supply unit PSU1 receives the calibration permission (S5a), starts the calibration operation, and gradually raises the output voltage command value of the power supply unit PSU1 itself (S6a). Also, the calibration stop request (S5b) is received in the management microcomputer 80, and the management microcomputer 80 notifies the power supply unit PSU1 of the matter (S6b).

The power supply unit PSU1 receives the calibration stop request (S6b), stops raising the output voltage command value, and measures the output voltage $V_{psu1}$ and output current $I_{psu1}$ of the power supply unit PSU1 itself. Then, the power supply unit PSU1 lowers the output voltage command value to a predetermined standby voltage or to zero, generates completion notification, and transmits the completion notification to the management microcomputer 80 (S7). Even when there is no calibration stop request from the management microcomputer 80 (S6b), the power supply unit PSU1 may independently transmit completion notification to the management microcomputer 80 at a point at which output current of a sufficient magnitude is secured.

The management microcomputer 80, on receiving the completion notification, confirms that no calibration operation is being carried out by another power supply unit, then creates a state wherein a new calibration request can be received (S8). Also, by the management microcomputer 80 notifying the power supply unit PSU0 that this calibration operation is completed, the power supply unit PSU0 recognizes the stopping of this calibration operation (S9).

Furthermore, the management microcomputer 80 calculates the wiring resistance $R_1$ from the output terminal of the power supply unit PSU1 to the output point 50 using the output voltage $V_{psu1}$ and output current $I_{psu1}$ measurement results notified of by the power supply unit PSU1 and the voltage of the output point 50.

Herein, when all the power supply units PSU0, PSU1, PSU2, and PSU3 are operated in parallel, the output voltage command value of the power supply unit PSU1 is as in Expression 6, because of which the management microcomputer 80 calculates a resistance value ($3R_1$) necessary in order to calculate the output voltage command value of the power supply unit PSU1 in accordance with Expression 6 as a corrective resistance, and transmits the corrective resistance to the power supply unit PSU1 (S10).

The power supply unit PSU1 calculates the output voltage command value of the power supply unit PSU1 in accordance with Expression 6, using the received corrective resistance and the output voltage $V_{psu1}$, the output current $I_{psu1}$, which is a common identical value when all the power supply units are operated in parallel, and the droop coefficient K (S11).

Also, with regard to the power supply units PSU2 and PSU3 too, the wiring resistances $R_2$ and $R_3$ from the output terminals of the units PSU2 and PSU3 respectively to the output point 50 can be calculated using the same calibration operation as in FIG. 7.

In order for the power supply unit PSU2 to calculate the output voltage command value of the power supply unit PSU2 itself, a corrective resistance ($3R_1+2R_2$) using the wiring resistances $R_1$ and $R_2$ is necessary according to Expression 7, and in order for the power supply unit PSU3 to calculate the output voltage command value of the power supply unit PSU3 itself, a corrective resistance ($3R_1+2R_2+R_3$) using the wiring resistances $R_1$, $R_2$, and $R_3$ is necessary according to Expression 8.

Consequently, it is sufficient that the management microcomputer 80 stores the wiring resistances $R_1$, $R_2$, and $R_3$ calculated for the power supply units PSU1, PSU2, and PSU3, and transmits the corrective resistances calculated using the wiring resistances $R_1$, $R_2$, and $R_3$ (($3R_1$) for the power supply unit PSU1, ($3R_1+2R_2$) for the power supply unit PSU2, and ($3R_1+2R_2+R_3$) for the power supply unit PSU3) to the respective power supply units.

It goes without saying that the heretofore described corrective resistance varies depending on system configuration, that is, depending on which power supply units are operated in parallel (which units are adopted as an operation system).

For example, when the three power supply units PSU0, PSU2, and PSU3 are adopted as an operation system and the power supply unit PSU1 is adopted as a stand-by system, the management microcomputer 80 calculates a corrective resistance ($2R_1+2R_2$) based on Expression 13 and transmits the corrective resistance ($2R_1+2R_2$) to the power supply unit PSU2, and calculates a corrective resistance ($2R_1+2R_2+R_3$) based on Expression 14 and transmits the corrective resistance ($2R_1+2R_2+R_3$) to the power supply unit PSU3.

Also, with regard to the power supply unit PSU0, it is sufficient that the output voltage command value is calculated in accordance with Expression 5 (=Expression 12) for any kind of system configuration, with no need to take corrective resistance into consideration.

Provided that each power supply unit carries out parallel operation in accordance with the output voltage command value calculated using the corrective resistance in this way, the output currents $I_{psu0}$ through $I_{psu3}$ can be controlled to be of equal values, whereby current balance can be maintained with high accuracy.

As the output voltage $V_{psun}$ of each power supply unit PSUn, the common output current $I_{psun}$, the droop coefficient K, and the corrective resistance for each power supply unit PSUn can be gathered in the management microcomputer 80, the management microcomputer 80 may calculate all the output voltage command values of the power supply units PSUn, and subsequently transmit the output voltage command values to each power supply unit PSUn.

According to the embodiment, as heretofore described, the output current of each unit can be balanced by the units being operated in parallel based on droop characteristics in which wiring resistances between unit output terminals are reflected.

The disclosure can be utilized in a direct current power supply device wherein power is supplied to a load by a multiple of direct current power supply units operating in parallel. Furthermore, the disclosure is particularly useful when there is a low voltage and a high current output, and a voltage drop caused by wiring resistance from a direct current power supply unit to a load is of a magnitude that cannot be ignored.

In embodiments according to the present disclosure, functionalities of calculation, control, computing and/or information processing may be implemented in the form of at least one hardware processor configured to perform these functionalities. That is, each of the microcomputers mentioned in this disclosure may be at least one hardware processor, and the performance of any one or more of the functionalities may be accomplished by a single hardware processor, or be divided among multiple hardware processors.

Inclusion in this disclosure of any characterization of any product or method of the related art does not imply or admit that such characterization was known in the prior art or that such characterization would have been appreciated by one of ordinary skill in the art at the time a claimed was made, even if the product or method itself was known in the prior art at the time of invention of the present disclosure. For example, if a related art document discussed in the foregoing sections of this disclosure constitutes statutory prior art, the inclusion of any characterization of the related art document does not imply or admit that such characterization of the related art document was known in the prior art or would have been appreciated by one of ordinary skill in the art at the time a claimed invention was made, especially if the characterization is not disclosed in the related art document itself.

In the claims, recitation of "a plurality of direct current power supply units" does not preclude other additional direct current power supply units not referred to by the phrase "plurality of."

While the present disclosure has been particularly shown and described with reference to the embodiments thereof, it will be understood by those skilled in the art that the foregoing and other changes in form and details can be made therein without departing from the spirit and scope of the present disclosure.

Reference signs and numerals are as follows:
PSU0 through PSU3: power supply unit (main power supply unit)
BBU4 through BBU7: battery unit (back-up unit)
10: alternating current power supply
20: load
21: motherboard
31: AC/DC conversion unit
32: DC/DC conversion unit
33: diode
41: battery
42: DC/DC conversion unit
43: diode
50: output point
61: control microcomputer
61a: A/D conversion unit
61b: PWM circuit
61c: general purpose input/output unit
61d: serial communication unit
62: direct current detector
63: reverse flow prevention element
64: level conversion unit
65: pull-up resistor
70: back board
80: management microcomputer
81: serial communication unit

What is claimed is:

1. A method of controlling a direct current power supply device that supplies direct current power to a load by a plurality of direct current power supply units, which have respective droop characteristics, being operated in parallel, the plurality of direct current power supply units configured to supply the direct current power to the load through an output point of the direct current power supply device, the method comprising:
   equalizing output currents of the plurality of direct current power supply units by calculating wiring resistances between output terminals of the plurality of direct current power supply units using values of an output voltage and output current of each of the direct current power supply units and a voltage of the output point of the direct current power supply device, and for each direct current power supply unit of the plurality of direct current power supply units, when the plurality of direct current power supply units are operated in parallel, using:

an output current of the same magnitude common to all of the plurality of direct current power supply units, as a value of an output current of the respective direct current power supply unit, an output voltage of the respective direct current power supply unit, a droop coefficient, and at least one of the wiring resistances, to calculate an output voltage command value of the respective direct current power supply unit by using a relation, which indicates a droop characteristic of the respective direct current power supply unit, between the at least one of the wiring resistances, the output voltage, output current, and output voltage command value of the respective direct current power supply unit, and the droop coefficient.

2. The direct current power supply device control method according to claim 1, comprising, for each of the plurality of direct current power supply units:

performing a calibration operation that calculates the output voltage command value of the respective direct current power supply unit in order to carry out parallel operation of the plurality of direct current power supply units, the calibrating operation including:

gradually raising an output voltage of another direct current power supply unit of the plurality of direct current power supply units when the respective direct current power supply unit operates, calculating one of the wiring resistances using the output voltage and output current of the another direct current power supply unit and the voltage of the output point of the direct current power supply device, and calculating the output voltage command value of the another direct current power supply unit using output current of the same magnitude common to the plurality of direct current power supply units, the output voltage of the another direct current power supply unit, the droop coefficient, and the wiring resistance.

3. A direct current power supply device control device, being a control device of a direct current power supply device that includes a plurality of direct current power supply units operable in parallel to supply a direct current power to a load through an output point of the direct current power supply, each of the plurality of direct current power supply units having respective droop characteristics, detectors to detect output voltage and output current of the direct current power therefore, and at least one processor configured to calculate an output voltage command value thereof, the control device comprising:

a communication interface to communicate with the plurality of direct current power supply units;

at least one processor configured to control the control device to implement equalizing of output currents of the plurality of direct current power supply units by calculating values of wiring resistances between output terminals of the plurality of direct current power supply units using values of an output voltage and output current of each of the direct current power supply units and a voltage of the output point of the direct current power supply device, and when the plurality of direct current power supply units are operating in parallel, calculating corrective resistances based on the wiring resistances and transmitting at least one of the corrective resistances to each direct current power supply units, wherein, for each of the plurality of direct current power supply units, the at least one processor of the respective direct current power unit is configured to use:

an output current of a same magnitude common to all of the direct current power supply units as a value of an output current of the respective direct current power supply unit, the output voltage of the respective direct current power supply unit, the droop coefficient, and at least one of the corrective resistances, to calculate an output voltage command value of the respective direct current power supply unit by using a relation, which indicates a droop characteristic of the respective direct current power supply unit, between the at least one of the corrective resistances, the output voltage, output current, and output voltage command value of the respective direct current power supply unit, and the droop coefficient.

4. The direct current power supply device control device according to claim 3, wherein the plurality of direct current power supply units are:

a plurality of main power supply units, which convert alternating current power to direct current power and supply the direct current power to the load, or a plurality of back-up units, which supply direct current power to the load when operation of the main power supply unit is stopped.

* * * * *